(12) United States Patent
Gottlöber

(10) Patent No.: US 6,232,565 B1
(45) Date of Patent: May 15, 2001

(54) BALE-WEIGHING SYSTEM FOR MOBILE BALING PRESS

(75) Inventor: Dietrich Gottlöber, Neustadt (DE)

(73) Assignee: Case Harvesting Systems GmbH, Neustadt (DE)

( * ) Notice: Subject to any disclaimer, the term of this patent is extended or adjusted under 35 U.S.C. 154(b) by 0 days.

(21) Appl. No.: 09/368,102

(22) Filed: Aug. 3, 1999

(30) Foreign Application Priority Data

Aug. 4, 1998 (DE) ................................................ 198 35 163

(51) Int. Cl.[7] ............................ G01G 19/08; G01G 19/03
(52) U.S. Cl. ............................ 177/136; 702/174; 702/175
(58) Field of Search .................................. 702/173, 174, 702/175; 177/136, 137, 138, 139, 141

(56) References Cited

U.S. PATENT DOCUMENTS

| | | | |
|---|---|---|---|
| 4,347,903 | * 9/1982 | Yano et al. | 177/25.13 |
| 4,742,880 | * 5/1988 | Schrag et al. | 177/136 |
| 5,300,736 | * 4/1994 | Ehrhardt | 177/145 |
| 5,384,436 | * 1/1995 | Pritchard | 177/136 |
| 5,635,679 | * 6/1997 | Kohashi et al. | 177/25.13 |
| 5,742,010 | * 4/1998 | Griffin | 177/161 |
| 5,959,257 | * 9/1999 | Campbell et al. | 177/119 |

* cited by examiner

Primary Examiner—Randy W. Gibson
(74) Attorney, Agent, or Firm—Herbert Dubno; Andrew Wilford

(57) ABSTRACT

Square bales are produced by a baler having a pressing passage from which emerges a succession of the bales that travel rearward from the press passage over an output chute and fall off a rear edge of the chute from the baler. The bales are weighed by continuously monitoring the downward force with which the bales bear on the chute rear edge, continuously calculating an average of the monitored force, establishing as an individual bale weight the calculated average each time it peaks before a bale drops from the chute rear edge, and storing the individual bale weights.

11 Claims, 3 Drawing Sheets

BALE-WEIGHING SYSTEM FOR MOBILE BALING PRESS

SPECIFICATION

1. Field of the Invention

The present invention relates to a system for weighing bales. More particularly this invention concerns a method of and apparatus for weighing bales as they exit a mobile baler.

2. Background of the Invention

Hay is particularly useful as animal bedding, horticultural mulch, and for industrial and commercial purposes such as in insulation and packing materials. Hay is produced by cutting standing crop and, normally after stripping off any useful part, spreading it on the field to dry for some time.

In order to turn the loose hay into a product that can be transported, stored, and accounted for, it is pressed into bales. Some crops can be baled fresh. For commercial purposes the so-called square bale, which is actually parallepipedal, is used. It is produced in a baler that picks the cut crop up off the ground, normally comminutes it somewhat, presses it into bales, applies ties around the bales, and drops the bales on the field behind the machine. In view of the pace of the baling operation, it is more expedient for the baler simply to leave a trail of bales in the field that are later picked up by a different crew operating at a different pace.

Much hay is sold right from the field, that is the purchaser actually picks up and carts off the product, so it is important to know the actual weight of the bales. Depending on product, dryness, compressibility, and other factors, the bale weight and even length can vary somewhat. The product is sold by total weight so, in addition to the count, the weight of the bales, which as mentioned above can vary from one side of a field to another, is critical information. The bale count is easily determined, either automatically by the baler as it ties each individual bale, or simply by counting the bales in the field. The purchaser does not want underweight or undersize bales and the seller does not want to produce overweight or oversize bales, unless there is some allowance.

Accordingly, German patent document 195 43 343 discloses several devices for weighing bales wherein the weight of the output end of the housing of the pressing passage is monitored each time the baling mechanism—press or tier— cycles. This measurement is fairly inexact as the relatively robust housing forming the press passage is certain to have a weight which is a multiple of that of any bale being produced. The entire mechanism is also probably jolting up and down in a field as the measurements are taken, so the one-time measurement is easily incorrect, perhaps because it was taken just when a wheel of the baler dropped into a rut or hit a rock. Furthermore since the variation in weight at the measured point is only a fraction of the overall weight, it is difficult to determine weight accurately, especially as the press-passage housing must be relatively solidly mounted. Finally there is the question of bale length which might vary and falsify readings further in such a baling operation.

Further systems for weighing bales use a weight sensor at the hitch by means of which the normally two-wheeled baler is towed by a tractor also having a power takeoff that drives the baler. Such a sensor can detect the weight of the crop stream being picked up and processed, but once again is highly inaccurate in that the baler and tractor are riding on very rough ground so the equipment is moving somewhat violently both horizontally and vertically, and the weight of the crop stream is a small fraction of the overall weight bearing on the hitch. In fact it is such a small part that its percentage may be smaller than the accuracy rating for the sensor, making it in fact not measurable. Placing sensors on the wheel axles is similarly ineffective.

Above-mentioned German 195 43 343 also proposes that the individual bale weight be determined by monitoring the overall weight of the baler at least at the output, and taking particular note of its periodic sudden weight losses, as occurs when a bale drops off. Once again, however, too much equipment is being weighed along with the bale to give an accurate reading.

German 44 36 128 further suggests a bale-weighing device which is integrated in the baler's output chute from which finished bales drop directly to the ground. The chute is constituted as a nearly vertically oriented support frame that is secured by means of upper and lower links to the rear end of the press-passage housing. The fixed frame extends as a rearward continuation of the floor of the press passage and serves to hold an entire bale just before it is dropped onto the field behind the advancing machine. Once the bale reaches a predetermined position, it tips the entire output chute from the horizontal to drop it onto the field. The measurement is made at the instant the chute tips by a sensor that is fixed via a holder on the end of the press passage. The sensor is connected via a controller with a computer for displaying overall bale weight, the weights of the individual bales, and the bale count.

The disadvantage of this system is that the measurements are not accurate enough when the baler is moving, as for instance being towed behind a tractor, as extraneous movements falsify so many of the readings that the results would be unusable. Stationary use is only rarely efficient so this system has limited applicability. Furthermore the output chute and its mount must be made particularly durable to withstand the harsh conditions it is subjected to when in ordinary use. Finally this system requires that the bales succeed each other with some spacing out of the press passage, something that is not always the case. When the succeeding bale is actually pushing on the outgoing bale, any weight measurements are likely to be seriously incorrect.

OBJECTS OF THE INVENTION

It is therefore an object of the present invention to provide an improved system for weighing bales at the output of a mobile baler.

Another object is the provision of such an improved system for weighing bales at the output of a mobile baler which overcomes the above-given disadvantages, that is which produces an accurate measurement of the weight of each bale, even when the baler is moving along the ground and the bales issue from the baling passage in contact with one another.

SUMMARY OF THE INVENTION

Square bales are produced by a baler having a pressing passage from which emerges a succession of the bales that travel rearward from the press passage over an output chute and fall off a rear edge of the chute from the baler. The bales are weighed according to the invention by continuously monitoring the downward force with which the bales bear on the chute rear edge, continuously calculating an average of the monitored force, establishing as an individual bale weight the calculated average each time it peaks before a bale drops from the chute rear edge, and storing the individual bale weights.

Thus with this system the continuous measuring and the averaging of the continuously received values allows the anomalies created by the equipment bouncing up and down in the field to be eliminated. The average value will increase as a bale moves back over the downwardly deflectable rear portion of the output chute until its front end tips up and the bale falls off the chute. At this last instant the average value will peak and will correspond exactly to the actual weight of the bale. At this instant when the bale tips up and applies all its weight to the outer end of the chute, it also separates itself from any bale pushing it so that only this one bale, regardless of its length, is weighed. The controller can easily store the weights of the bales and produce a total value for the field that accurately reflects the exact weights of the individual bales, even if some are drier and, hence, lighter or vice versa. The weights of the bales can be displayed to the operator of the tractor pulling the baler so he or she can monitor the baling operation.

The average is calculated over a period of time substantially shorter than a time a bale takes to completely travel past the rear edge. This ensures an accurate measurement. In addition the force is monitored directly at the rear edge, that is the downward force in other regions is largely ignored.

In order to cancel out the effect of lateral forces as the baler turns or tips on an uneven field, any nonvertical orientation of the baler is determined and any instantaneously determined forces are corrected with a factor derived from this instantaneously determined off-vertical position.

It is also within the scope of this invention for the force to be continuously monitored only in a time period immediately before and after a bale drops from the chute rear edge. This time period can be easily determined by the known operation cycle of the baler which moves the bales at a certain average rate, with the tying operation used to determine the start of each cycle.

Thus the apparatus of the instant invention has a sensor for continuously monitoring the downward force with which the bales bear on the chute rear edge and a computer for continuously calculating an average of the monitored force, for establishing as an individual bale weight the calculated average each time it peaks before a bale drops from the chute rear edge, and for storing the individual bale weights. More specifically the chute has a front end fixed to the baler and is pivotal on the baler at this front end. Means is provided for urging the chute rear end upward with a generally constant force. The sensor detects deflection of the chute at the front edge. The chute is formed as a roller conveyor and is provided at the rear edge with a roller over which the bales pass.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
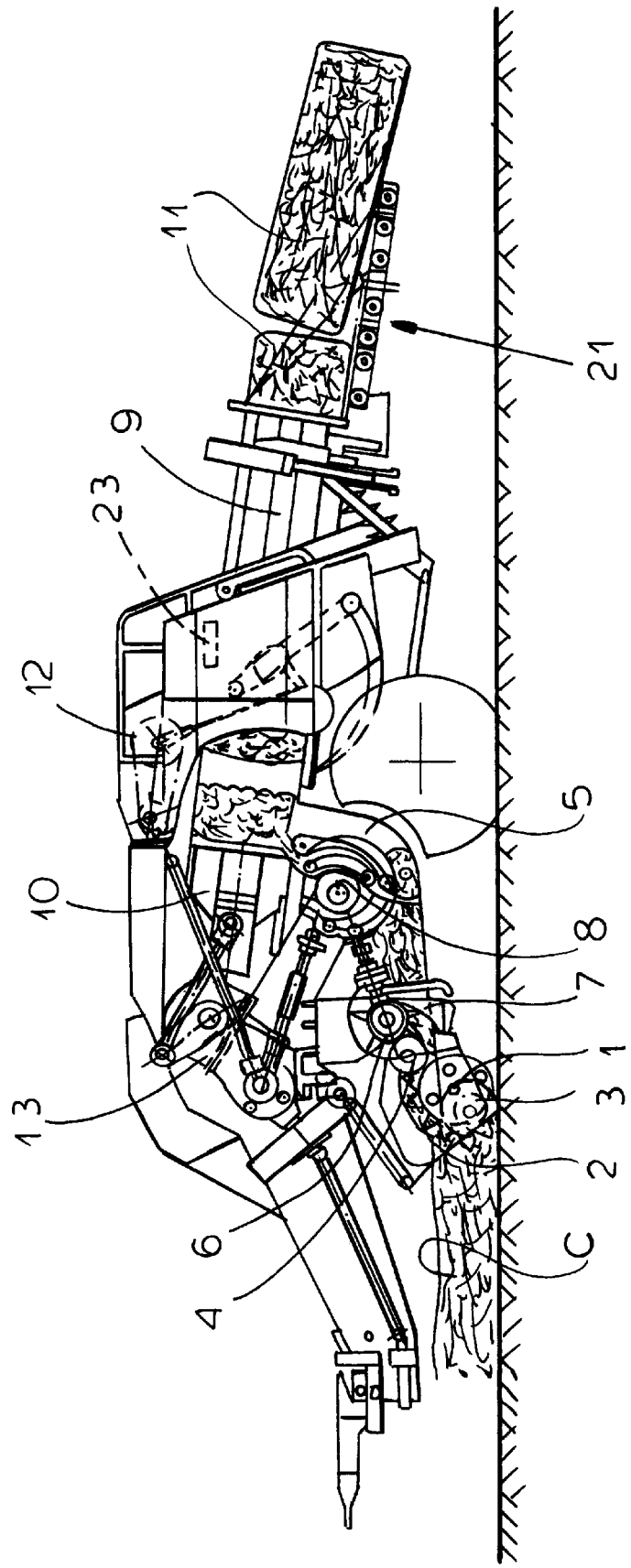
FIG. 1 is a small-scale partly diagrammatic and partly sectional side view of a baler according to the invention.

As seen in FIG. 1 a baler has on its front end a pickup 1 with teeth 2 that pick up windrows of crop C from the ground. Wheels 3 support the equipment on the ground, normally behind an unillustrated tractor. An auger-type transverse conveyor 4 brings all the crop together into an input conduit 5, after the crop has been somewhat comminuted by a cutter 6 having cutting blades 7. Another conveyor 8 presses the comminuted crop through the conduit 5 into a pressing passage 9 where a piston 10 forces it as bales 11 out a rear chute 21. A tying device 12 places standard wires or ties around the bales B. Everything is powered from a drive 13 that is in turn connected to the power takeoff of the unillustrated tractor.

Figure 2:
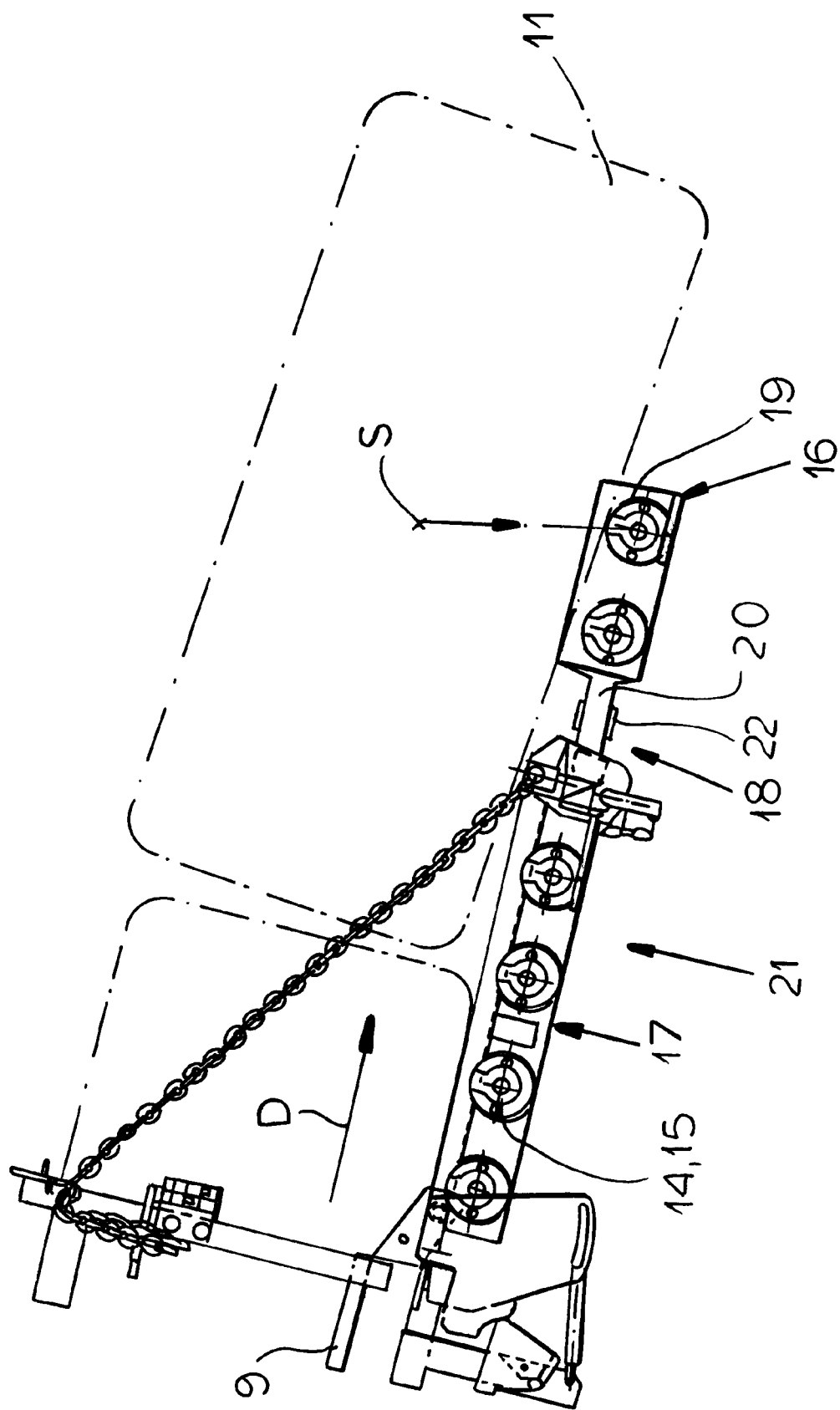
FIG. 2 is a larger-scale side view of the rear end of the baler.

The chute 21 at the rear end of the passage 9 has a support surface formed by a roller conveyor 14 having rollers 15 along which the bales 11 move in a transport direction D as shown in FIG. 2. The chute 21 is formed by a front portion 17 that is essentially fixed to the rear end of the passage or tunnel 9, a flexible joint 18, and an outer end portion 16 forming a rear end or edge 19 at which is located one of the rollers 15. The joint 18 is formed by a flexible part defining a horizontal pivot axis for the rear portion 16 and incorporating springs that normally hold the portion 16 in line with the portion 17.

According to the invention strain-gauge sensors 22 are provided on the upper and lower sides of the flexible pivot joint 18 so as to measure deflection of the portion 19 against the inherent resiliency of the joint 18 which tends to keep it parallel to the front portion 17.

The overall length of the rear portion 16 is less than half the length of the shortest bale 11 the machine is likely to produce. Thus as the bales 11 are pushed out, with the front end of one bale directly against the rear end of the preceding bale, the rearmost bale 11 will come to a position when its center of mass S will pass the rear end 19 and, for a few seconds, the full weight of each bale 11 is thus effective as a downward force that will result in a predetermined downward deflection of the rear portion 16. The sensors 22 can closely monitor the extent of this deflection, which is exactly proportional to the weight of the bale 11 being tipped off the back of the baler, and feed this information to a computer controller 23 (FIG. 1) on the baler frame.

Figure 3:
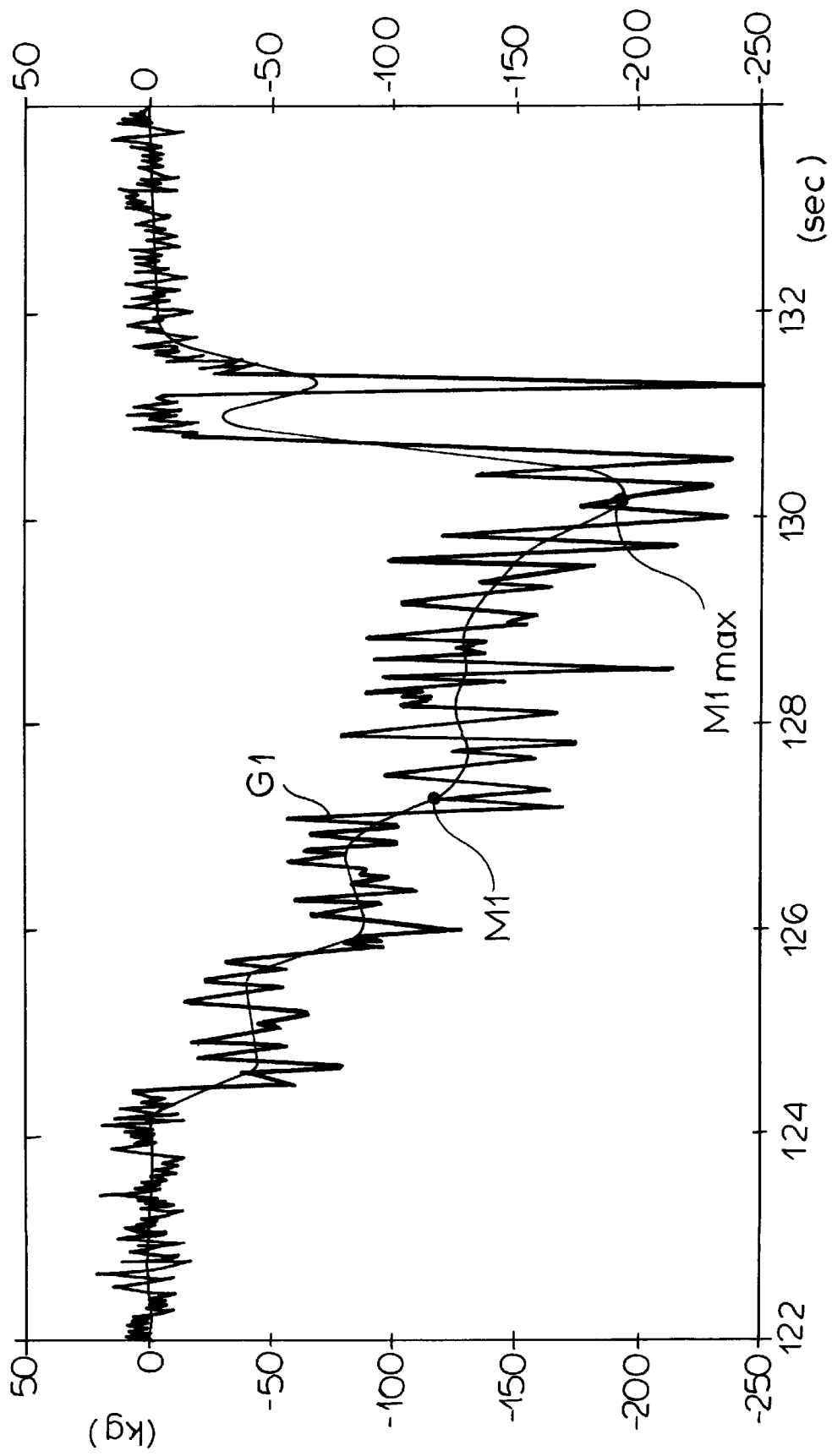
FIG. 3 is a graph illustrating the instant invention.

FIG. 3 shows in accordance with this invention the downward force G1 exerted on the end 19 of the rear portion 16 plotted against time. As can be seen from second 122 to about second 125, when the rear portion 16 supports nothing, the mass detected varies by about 40 kg principally because the equipment is bouncing along rough ground. This variation is even more marked as the bale 11 starts to exert weight on the rear portion 16 until about second 131 when the bale drops off and the rear portion 16 snaps back up to await the next bale.

According to the invention the computer 23 calculates the average M1 of the instantaneously determined forces G1. This average M1 peaks or reaches a maximum $M1_{max}$ just before the bale drops off. This maximum $M1_{max}$ accurately represents the mass of the bale 11 being dropped. Here, some other factor, for instance the wheel of the baler dropping into a rut, has caused the value G1 to spike after the bale 11 was dropped, but since an average is being used this anomaly will not affect the reading.

The computer 23 is normally also linked to the tying device 12 so that it knows exactly the rate at which the bales 11 are being produced so it can easily assign a weight to each bale being produced, and can calculate the total produced by simple addition. If the system is reset before a field is baled, it is possible to get an exact count of the bales plus the weights of the individual bales and the total weight. This is very useful information in the marketing of the baled hay.

I claim:

1. A method of weighing square bales produced by a mobile baler having a pressing passage from which emerges a succession of the bales that travel rearward from the press passage over an output chute and fall off a rear edge of the chute while the baler continues to travel and produce bales, the method comprising the steps of:

continuously monitoring only the downward force with which the bales bear on the chute rear edge;

calculating an average of the monitored force;

establishing as an individual bale weight the calculated average only as it peaks immediately before a bale drops from the chute rear edge; and storing the individual bale weights.

2. The bale-weighing method defined in claim 1 wherein the average is calculated over a period of time substantially shorter than a time a bale takes to completely travel past the rear edge.

3. The bale-weighing method defined in claim 1 wherein the force is monitored directly at the rear edge.

4. The bale-weighing method defined in claim 1, further comprising the step of determining any nonvertical orientation of the baler and correcting any instantaneously determined forces with an factor derived from an instantaneously determined off-vertical position.

5. The bale-weighing method defined in claim 1 wherein the force is continuously monitored only in a time period immediately before and after a bale drops from the chute rear edge.

6. The bale-weighing method defined in claim 1 wherein the individual bale weights are added together.

7. The bale-weighing method defined in claim 1 wherein as the bales emerge from the passage a leading end of each bale continuously engages a trailing end of the preceding bale and continuously pushes same until it tips up and drops off the rear chute edge.

8. In combination with a mobile baler having a pressing passage from which emerges a succession of the bales that travel rearward from the press passage over an output chute and fall off a rear edge of the chute while the baler continues to travel and produce bales, a bale-weighing apparatus comprising:

sensor means for monitoring only the downward force with which the bales bear on the chute rear edge; and computer means for calculating an average of the monitored force, for establishing as an individual bale weight the calculated average only as it peaks before a bale drops from the chute rear edge, and for storing the individual bale weights.

9. The bale-weighing apparatus defined in claim 8 wherein the chute has a front end fixed to the baler and is pivotal on the baler at this front end, the apparatus further comprising means for urging the chute rear end upward with a generally constant force, the sensor means detecting deflection of the chute at the front edge.

10. The bale-weighing apparatus defined in claim 8 wherein the chute is formed as roller conveyor.

11. The bale-weighing apparatus defined in claim 8 wherein the chute is provided at the rear edge with a roller over which the bales pass.

* * * * *